Figure 1:
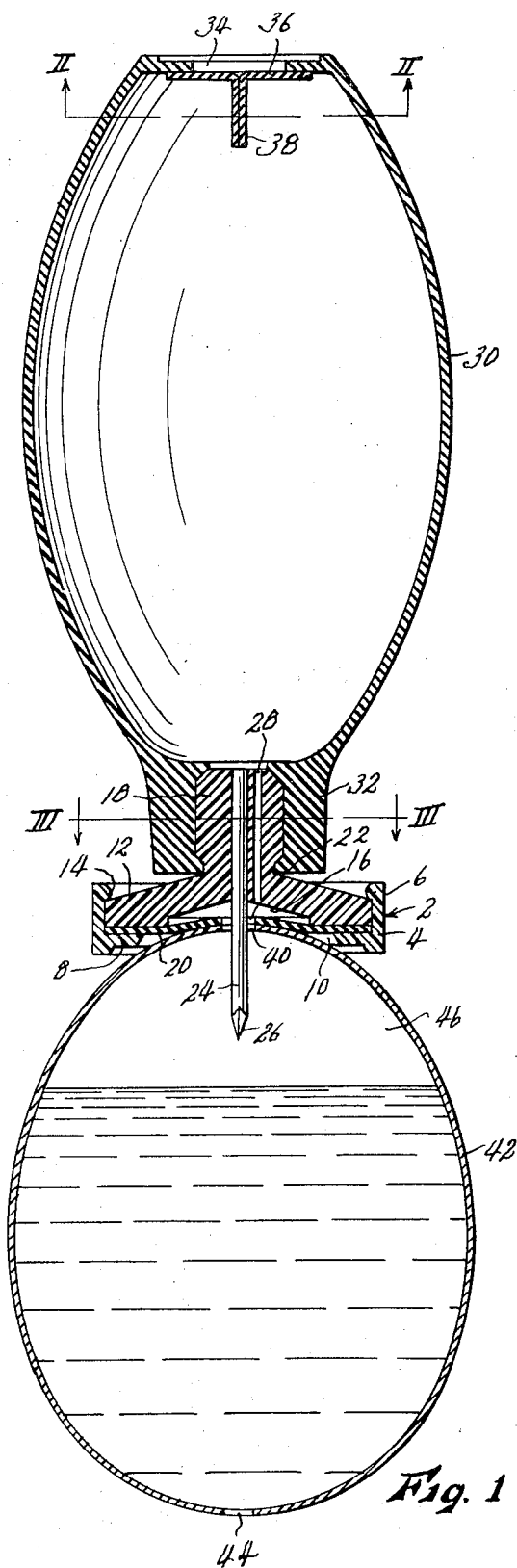

United States Patent [19]
Hoyt et al.

[11] 3,855,915
[45] Dec. 24, 1974

[54] EGG BLOWING DEVICE

[76] Inventors: Harold R. Hoyt; Marjorie L. Hoyt, both of 321 N. Treat Ave., Shawnee Mission, Kans. 85716

[22] Filed: Feb. 12, 1973

[21] Appl. No.: 331,973

[52] U.S. Cl. .................................. 99/495, 99/506
[51] Int. Cl. ............................................ A47j 43/14
[58] Field of Search .................... 99/486, 495–506, 99/567–570

[56] References Cited
UNITED STATES PATENTS

| | | | |
|---|---|---|---|
| 1,945,860 | 2/1934 | Laffler | 99/495 X |
| 2,224,941 | 12/1940 | Weimer | 99/568 X |
| 2,445,490 | 7/1948 | Meade | 99/495 |
| 2,594,619 | 4/1952 | Bosch et al. | 99/486 |
| 2,822,009 | 2/1958 | Haus | 99/495 X |
| 3,055,407 | 9/1962 | Conrad | 99/495 |
| 3,331,415 | 7/1967 | Hall | 99/504 |

Primary Examiner—John Petrakes
Attorney, Agent, or Firm—John A. Hamilton

[57] ABSTRACT

An egg blowing device consisting of a hollow body member one wall of which constitutes a flexible diaphragm adapted to be pressed against an egg, the diaphragm having a hole therein adapted to overlie a hole formed in the shell of the egg, a shell piercing spike fixed in the body member and projecting outwardly through the hole of the diaphragm, and an air pump for introducing air under pressure into the body member.

9 Claims, 5 Drawing Figures

PATENTED DEC 24 1974 3,855,915

EGG BLOWING DEVICE

This invention relates to new and useful improvements in egg blowing devices, which are devices for removing the liquid whites and yolks of an egg by blowing them outwardly through a very small hole formed in the egg shell by means of air introduced under pressure through another small hole formed in the shell.

There has developed a large and growing number of persons devoted to the art of decorating egg shells, ornamentation being performed both of the exterior surfaces of the shell, and of the interiors thereof, the latter for example by the construction of intricate miniature displays within the shell, adapted to be viewed through window openings formed by breaking out portions of the shell. These persons, who are organizing into active national groups and are commonly known as "eggers", obviously have need for a device which will blow the eggs easily, efficiently and conveniently, since obviously the ornamentation can be performed only on empty shells. Devices for this purpose, to our knowledge, have heretofore been subject to certain shortcomings and difficulties of operation, particularly if the blowing device and the egg are to be hand-held during the blowing operation. These difficulties are caused by the problem of maintaining an efficient air seal around the air entry hole of the shell as air is introduced thereinto, to prevent the escape of air to the atmosphere and hence insure an operative build-up of pressure within the shell. Any relative movement of the shell and blowing device, which is inevitable if they are hand-held, will break the seal if special provision to prevent it is not made. The problem is complicated by the extreme fragility of the shell itself, which is such that if a sealing member, such as a rubber ring, is pressed thereagainst in encircling relation to the air entry hole, with sufficient force to provide the desired sealing action, there is a distinct danger that the shell may be crushed or shattered.

Accordingly, the principal object of the present invention is the provision of an egg blowing device which solves the above described difficulties in a simple and efficient manner. Generally, this object is accomplished by the provision of a device comprising a hollow hand-held body member, a yieldably soft and resilient sealing member carried by said body member and having an aperture therethrough adapted to overlie the air entry hole of the egg shell when said sealing member is pressed against said shell, said aperture communicating with the interior of the body member, and means for introducing air under pressure into the body member. The yieldability of the sealing member permits it to follow the egg, and maintain a seal against the egg around the air entry hole, during any slight relative movement of the egg and body member.

Another object is the provision of an egg blowing device of the character described wherein said sealing member constitutes a thin, flexible diaphragm forming one wall of said body member, whereby during operation said diaphragm and egg are pressed together to maintain a seal therebetween by the elevated pressures existing concurrently within the body member and within the egg shell, so that said diaphragm will follow the egg during any slight relative movement between the egg and body member.

A further object is the provision of an egg blowing device of the character described having a sharpened spike carried by said body member and projecting outwardly through the aperture of the sealing member. Said spike serves both as a tool for forming the air entry and fluid exit hole in the egg shell, and during the actual blowing operation as a centering device for maintaining registry of the sealing member aperture and the air entry hole of the egg shell.

Other objects are simplicity and economy of construction, and efficiency and dependability of operation.

Figure 2:
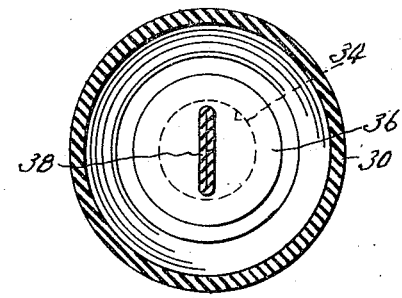
Figure 3:
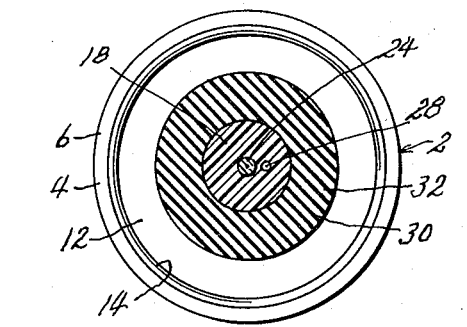
Figure 4:
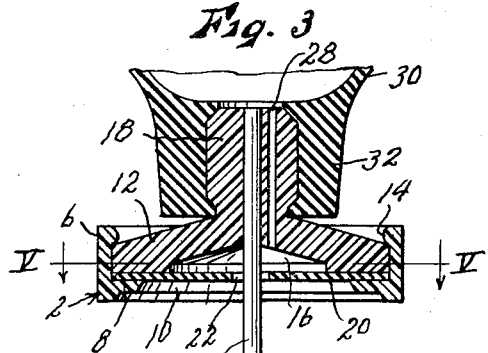
Figure 5:
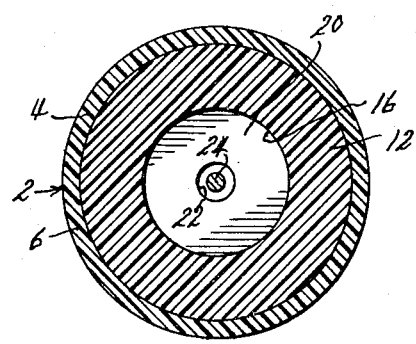

With these objects in view, as well as other objects which will appear in the course of the specification, reference will be had to the accompanying drawing, wherein:

FIG. 1 is an axial sectional view, to an enlarged scale, of an egg blowing device embodying the present invention, shown in operative relationship to an egg being blown, FIG. 2 is a sectional view taken on line II—II of FIG. 1, FIG. 3 is a sectional view taken on line III—III of FIG. 1, FIG. 4 is a fragmentary view similar to FIG. 1, with the egg omitted, and FIG. 5 is a sectional view taken on line V—V of FIG. 4.

Like reference numerals apply to similar parts throughout the several views, and the numeral 2 applies generally to the body member of the egg blowing device. Said body member includes a flat, circular cup 4 formed of plastic or the like, having a rim 6 and a flat circular floor 8 with a circular hole 10 formed centrally therein, and a disc member 12, also formed of plastic which fits snugly within the rim 6 of cup 4, being inserted by snapping it past an internal lip 14 of said cup rim, and retained in said cup by said rib. Said disc member has a recess 16 formed in the face thereof confronting cup floor 8, and is formed with an oppositely extending axial stem 18. Disposed between disc 12 and floor 8 of cup 4 is a thin diaphragm 20 of soft rubber or the like, firmly pressed therebetween to provide an airtight seal around its edges. Said diaphragm overlies central hole 10 of cup 4, and also recess 16 of disc 12, and has a small hole 22 formed centrally therethrough. Fixed axially in stem 18 is a small, very sharp spike 24 which projects through recess 16 and through hole 22 of diaphragm 20 to a point beyond body member 2. The point 26 of said spike should be needle sharp, and for reasons which will presently appear, should be pyramidal in form, having planar facets with sharp edges at the junctures of its facets. An air passage 28 formed in disc stem 18 interconnects with recess 16, and extends through the free end of said stem.

Also provided is a rubber squeeze bulb 30 which forms the principal element of an air pump for forcing air into recess 16 of the body member. Said bulb is provided at one end with a tubular neck 32 which is fitted elastically over stem 18, and at its opposite end with an opening 34 covered by a rubber membrane 36 which forms a normally flattened tube 38 opening into the bulb. Said tube constitutes a check valve, remaining closed when bulb 30 is manually compressed to prevent the escape of air therethrough, but opening responsively to a vacuum within the bulb to admit air when the bulb is released and allowed to expand.

In operation, spike 24 is first used to form an air entry hole 40 in one end of the shell, of an egg 42, and a fixed exit hole 44 at the opposite end of the egg shell. The faceted formation of the point 26 of the spike provides sharp edges which permit the spike to be twisted about its axis with a sort of boring or reaming action which permits formation of said holes with little danger that the shell will be broken or cracked in lines extending away from said holes. Said holes may also be slightly enlarged, particularly air entry hole 40, by chipping away the shell around the edges of the hole with the sharp point of the spike, in order to provide an open air passage through said hole around the spike. The egg yolk may be broken and the entire contents of the shell reduced to an even liquid state, either by shaking the egg vigorously before the holes 40 and 44 are formed, or by introducing a stirring rod into the egg through either one of said holes and moving it within the egg to break the yoke.

Then the spike 24 is inserted through shell hole 40 until the egg shell contacts diaphragm 20 and deflects said diaphragm into recess 16 of disc 12, as shown in FIG. 1. Then bulb 30 is alternately squeezed and released to institute a pumping action. Each time the bulb is compressed, check valve 38 closes to prevent the escape of air therethrough, and the resultant increase of pressure in the bulb forces air through passage 28 into recess 16 of disc 12, and thence through diaphragm hole 22 and hole 40 of the egg shell into the interior of the egg shell, creating pressure in the upper portion 46 of the shell above the liquid level therein, and forcing a portion of the egg contents outwardly through exit hole 44. Spike 24 at this time, serves as a centering pin insuring a registering relation between diaphragm hole 22 and egg shell hole 40. Each time bulb 30 is released, the sealing action of the egg contents prevents air from re-entering the bulb through passage 28, but check valve 38 opens responsively to the vacuum forming in the bulb, to admit atmospheric air. The alternate compression and release of the bulb is repeated until the expulsion of the egg contents through hole 44 is completed.

It will be seen that during the pressure phase of the pumping action, air is equally and positively pressurized both within recess 16 of disc 12 and within the chamber 46 of the egg shell occupied by air, and that the diaphragm 20 and the egg shell are thereby pressed firmly together to prevent the escape of air to the atmosphere. The only requirement to obtain this sealing action is that the egg shell be in contact with the diaphragm, at least lightly, in a full circle enclosing holes 22 and 40, as the compression of bulb 30 is commenced. This sealing action is also important, since the soft yieldable character of the diaphragm then permits it to follow the egg, being held thereagainst the air pressure, during any slight relative movements between the egg and the blowing device. The egg may be rocked, tilted, twisted, or even pulled slightly away from the blowing device, and the diaphragm will follow it. Such relative movements are virtually impossible to prevent in hand-held devices, that is, where the blowing device is held in one hand and the egg in the other as in the present case, since the manual manipulation of bulb 30 almost inevitably results in at least some slight movement of body member 2 relative to the egg.

However, a sealing member other than diaphragm 20 could be used if desired. Such an alternative sealing member could, for example, constitute a cylindrical plug of soft rubber or the like, having a hole corresponding to hole 22 of the diaphragm formed axially therethrough. Said plug could have a flange adapted to be secured between cup 4 and disc 12 of the body member, as is diaphragm 20, and could be of substantial axial length to extend well below the body member, and to permit free lateral movement of its free end. Spike 24 could also be dispensed with if desired, but if used should project through the axial hole of the plug and outwardly therefrom. In the operation of this form of the device, the bulk of the plug would prevent it from being deflected outwardly by internal air pressure in the body member, so that it would not follow outward movements of the egg, and hence would not provide a sealing action of the same efficiency as the diaphragm type. Instead, the sealing action would depend on the eggs being manually pressed against the outer end of the plug continuously with a firm pressure. The axial length of the plug, however, would permit its outer end to follow any lateral movement of the egg.

While I have shown and described a specific embodiment of my invention, it will be readily apparent that many minor changes of structure and operation, such as that described above, could be made without departing from the spirit of the invention.

What I claim as new and desire to protect by Letters Patent is:

1. An egg blowing device comprising:
   a. a hollow body member,
   b. a soft, elastic sealing member forming one wall of said body member and having an aperture formed therethrough communicating with the interior of said body member and opening through an external surface of said sealing member, said sealing member being elastically yieldable both inwardly and outwardly relative to said body member and adapted to be pressed manually against an egg with the said aperture registered with an opening formed in the shell of said egg, and to engage the shell of said egg around the entire periphery of said shell opening, and
   c. means carried by said body member and operable to introduce air under pressure into the interior of said body member, and, through said sealing member aperture and said egg shell opening, into the interior of said egg, whereby said sealing member is held against said egg is sealing relation about the opening in the shell thereof by said air pressure, despite relative movements between said egg and said body member, and whereby the contents of said egg are forced outwardly through another opening formed in the shell thereof.

2. An egg blowing device as recited in claim 1 wherein said air introducing means comprises a manually compressible elastic bulb mounted on said body member in communication with the interior thereof, and a check valve mounted in the wall of said bulb, and operable to permit ingress but prevent egress of air to and from said bulb.

3. An egg blowing device as recited in claim 1 with the addition of a centering pin fixed in said body member and projecting axially outwardly through the aperture of said sealing member to a point outwardly of said sealing member, said centering pin being of smaller cross sectional area than said aperture, and being adapted to extend into a hole formed in an egg shell to preserve a registered relation between the holes of said sealing member and said egg shell.

4. An egg blowing device as recited in claim 3 wherein the outer end of said centering pin is sharpened, whereby to serve as a tool for forming holes in the shells of eggs.

5. An egg blowing device as recited in claim 4 wherein the point of said centering pin is pyramidal in form, having planar facets with sharp corners at the junctures of said facets.

6. An egg blowing device as recited in claim 1 wherein said sealing member constitutes a thin diaphragm overlying an internal recess of said body member and sealing to said body member around its edges.

7. An egg blowing device as recited in claim 6 wherein the aperture of said diaphragm is disposed coaxially with the internal recess of said body member, and is of greatly less area than the cross-sectional area of said recess.

8. An egg blowing device as recited in claim 7 with the addition of a centering pin fixed coaxially in said body member and extending axially outwardly through the aperture of said diaphragm, said pin having a smaller cross-sectional area than the area of said aperture.

9. An egg blowing device as recited in claim 8 wherein the outer end of said centering pin is tapered to a sharp point.

* * * * *